United States Patent [19]

Suzuki et al.

[11] Patent Number: 5,233,426
[45] Date of Patent: Aug. 3, 1993

[54] REDUCED DIAMETER CAMERA HEAD FOR SOLID-STATE IMAGE PICKUP DEVICE AND METHOD OF PRODUCING SAME

[75] Inventors: Takahisa Suzuki; Tatsuki Tsukada, both of Yokohama; Kenzo Hatada, Katano, all of Japan

[73] Assignee: Matsushita Electric Industrial Co., Ltd., Osaka, Japan

[21] Appl. No.: 805,938

[22] Filed: Dec. 12, 1991

[30] Foreign Application Priority Data

Dec. 28, 1990 [JP] Japan ................. 2-408992

[51] Int. Cl.5 ............................... H04N 5/30
[52] U.S. Cl. ..................... 358/209; 358/229
[58] Field of Search ............... 358/209, 225, 229, 226, 358/98; 257/229, 231

[56] References Cited

U.S. PATENT DOCUMENTS 4,890,159 12/1989 Ogiu ........................ 358/98
4,896,217 1/1990 Miyazana et al. ............ 358/213.11
4,918,521 4/1990 Yabe et al. .................. 358/98
5,040,069 8/1991 Matsumoto et al. ........... 358/213.11

FOREIGN PATENT DOCUMENTS 61-59975 3/1986 Japan .
1-175372 7/1989 Japan .
2156179 10/1985 United Kingdom .

Primary Examiner—Michael T. Razavi
Assistant Examiner—Tuan V. Ho
Attorney, Agent, or Firm—Mason, Fenwick & Lawrence

[57] ABSTRACT

The present invention provides a compact camera head for a solid-state image pickup device, a dimension of which is not so limited by a package for a solid-state image pickup element. Outer-leads are connected via inner-leads respectively to electrodes of a solid-state image pickup chip to constitute the solid-state image pickup element. An optical glass plate is attached to a light-receiving surface of the solid-state image pickup chip. The outer-leads are connected to side electrodes of a circuit module constituted by a chip-connecting board, a circuit board and a connector board, to thereby provide an image pickup unit. The image pickup unit is inserted into a chassis, and the opposite open ends of the chassis are sealed by an optical filter and a seal plate.

5 Claims, 3 Drawing Sheets

REDUCED DIAMETER CAMERA HEAD FOR SOLID-STATE IMAGE PICKUP DEVICE AND METHOD OF PRODUCING SAME

FIELD OF THE INVENTION AND RELATED ART STATEMENT

This invention relates to a camera head for a solid-state image pickup device which camera head uses a solid-state image pickup chip, and also relates to a method of producing such a camera head.

Generally, a solid-state image pickup device comprises a lens, a camera head portion, and a camera control unit.

The camera head portion comprises an optical filter, a solid-state image pickup element, a circuit board, and a receptacle. These parts are contained or housed in a chassis. The solid-state image pickup element is formed by sealing a solid-state image pickup chip (solid-state image pickup semiconductor device) between an optical glass plate and a ceramics package. The solid-state image pickup element is larger in size as compared with the solid-state image pickup chip because of the provision of parts associated with the solid-state image pickup chip. Therefore, there has been encountered a problem that despite the solid-state image pickup chip per se is small, the camera head portion can not be reduced in size. In fact, in the case of using the solid-state image pickup element having the solid-state image pickup chip of ⅓ inch sealed in a ceramics package, the camera head must have a size at least equal to the diagonal length of the solid-state image pickup chip plus about 3 mm. Further, taking into consideration the circuit board (on which the solid-state image pickup element is to be mounted) and the receptacle to which the circuit board is to be mounted, the camera head must have a size equal to the diagonal length of the solid-state image pickup chip plus about 7 mm. Therefore, when the solid-state image pickup chip of ⅓ inch (8.5 mm) is used, the outer diameter of the camera head is about 3/5 inch (15 mm). It is difficult to insert the cameral head into a narrow portion, such as the interior of a pipe and the interior of a precision machine.

Further, since the solid-state image pickup chip can be easily affected by dust and moisture, it must be sealed by the ceramics package and the optical glass plate. Therefore, the feeding of signals to and from the solid-state image pickup chip is carried out through external terminal pins. This requires another board for holding these external terminal pins.

OBJECT AND SUMMARY OF THE INVENTION

It is an object of this invention to provide a camera head for a solid-state image pickup device which camera head has an outer diameter closer to a diagonal length of a solid-state image pickup chip.

According to the present invention, to this end, there is provided a camera head for a solid-state image pickup device comprising a chassis which has opposite open ends, and an image pickup unit housed in the chassis. The image pickup unit includes a solid-state image pickup chip constituted by a solid-state image pickup semiconductor device, chip-connecting board disposed adjacent to said solid-state image pickup chip and having an electric circuit mounted thereon, a connector board having external lead pins, leads connecting electrodes provided at an outer peripheral edge of at least one of said chip-connecting board and said connector board to electrodes of said solid-state image pickup chip, and a protective member sealing a light-receiving surface of said solid-state image pickup chip, said protective member being one of an optical glass plate and an optical filter.

DETAILED DESCRIPTION OF THE PREFERRED EMBODIMENTS

Figure 1:
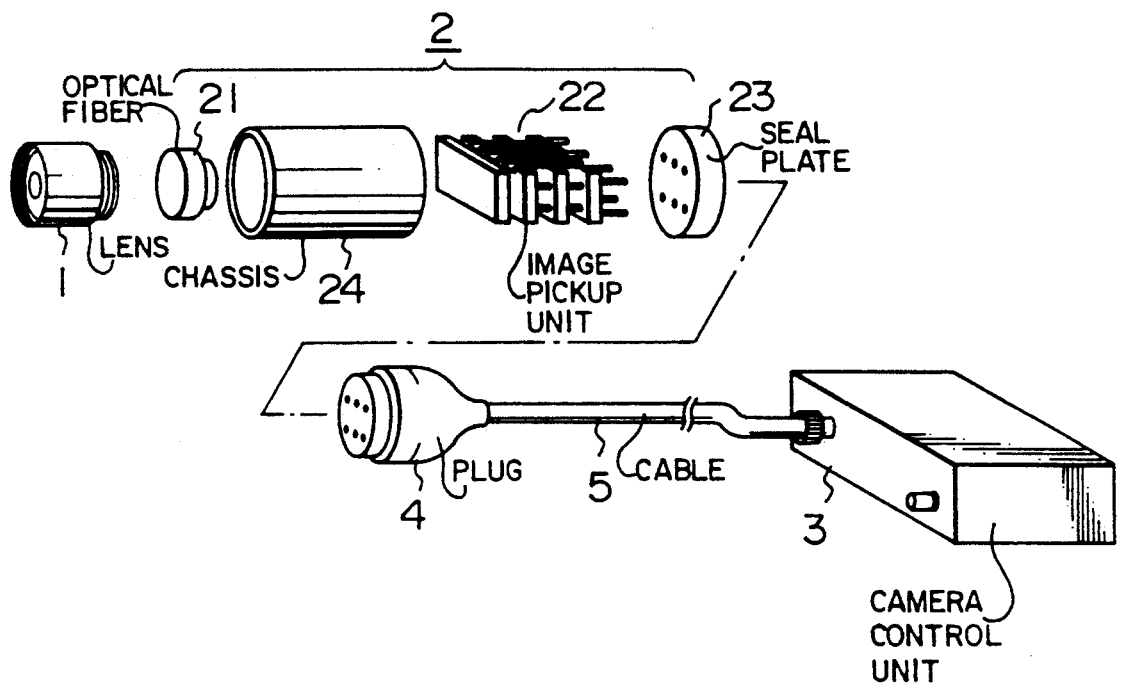
FIG. 1 is an exploded perspective view of a solid-state image pickup device using a camera head provided in accordance with one embodiment of the present invention.
Figure 2:
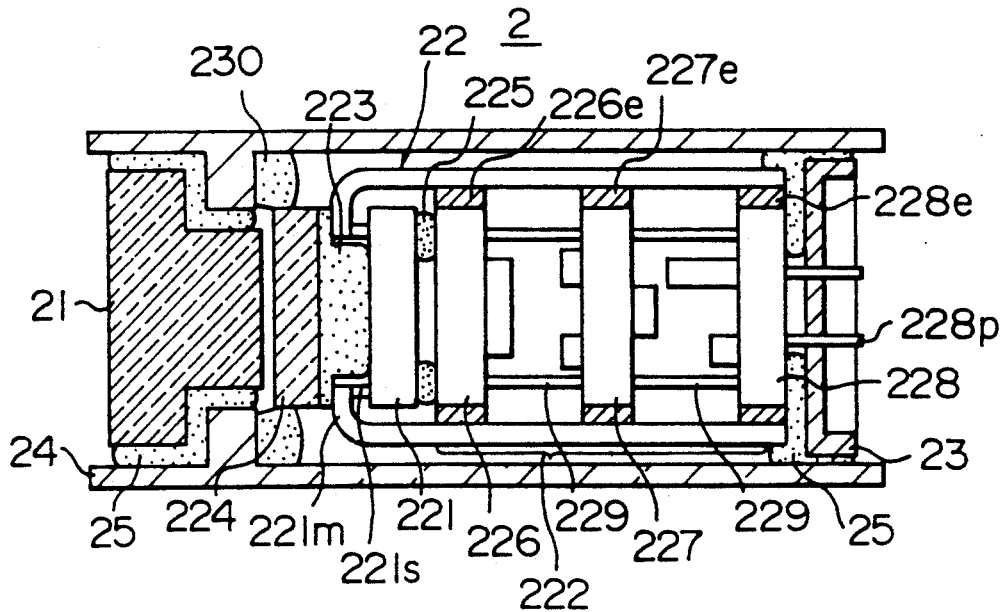
FIG. 2 is a cross-sectional view of the camera head shown in FIG. 1.

Referring to FIG. 1, a solid-state image pickup device comprises a lens 1, a camera head portion 2, and a camera control unit 3. The camera head portion 2 comprises an optical filter 21 for intercepting all rays except for visible rays or light, an image pickup unit 22, and a seal plate 23. As shown in FIG. 2, the image pickup unit 22 is housed in a chassis 24 of a hollow cylindrical shape. The opposite ends of the chassis 24 are closed by the optical filter 21 and the seal plate 23, respectively. The image pickup unit 22 is sealed in the chassis 24 through layers 25 of an adhesive.

When an image passing through the lens 1 is received by the image pickup unit 22, the video signal is amplified, and is fed to the camera control unit 3 via a plug 4 and a cable 5. The image is displayed on a monitor connected to the camera control unit 3.

As shown in FIG. 2 and FIGS. 3A to 3D, the image pickup unit 22 comprises a solid-state image pickup chip (solid-state image pickup semiconductor device) 221, and a circuit module 222. Outer-leads 221m are connected respectively to electrodes of the solid-state image pickup chip 221 via inner-leads 221s. An optical glass plate 224 is secured to the light-receiving surface of the solid-state image pickup chip 221 through an adhesive layer 223 of a light-transmitting nature The circuit module 222 is secured through an adhesive layer 225 to a surface of the solid-state image pickup chip 221 opposite to a light-receiving surface thereof.

The circuit module 222 comprises a chip-connecting board 226, a circuit board 227 including a circuit for driving the solid-state image pickup chip 221 and a circuit for amplifying the video signal from the solid-state image pickup chip 221, and a connector board 228. Signals are fed between these boards via connection pins 229, and signals are fed between the solid-state image pickup chip 221 and each of these boards via the outer-leads 221m and side electrodes 226e, 227e and 228e of the boards. External lead pins 228p are mounted on the connector board 228, and are adapted to be connected to the plug 4 so as to send the signals to the camera control unit 3.

The method of producing the image pickup unit 22 of the camera head of the present invention will now be described with reference to FIGS. 3A to 3D. This production method comprises the following five steps (i) to (v).

Figure 3A:
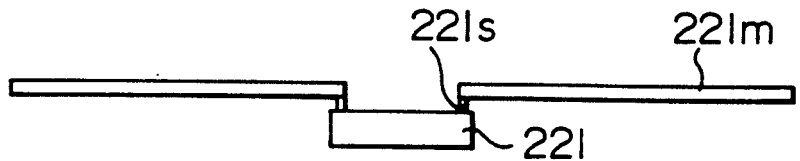
FIGS. 3A to 3D are views showing a method of producing an image pickup unit.

(i) First Step (FIG. 3A)

The inner-leads 221s are connected respectively to the electrodes of the solid-state image pickup chip 221, and the outer-leads 221m are connected respectively to the inner-leads 221s.

Figure 3B:
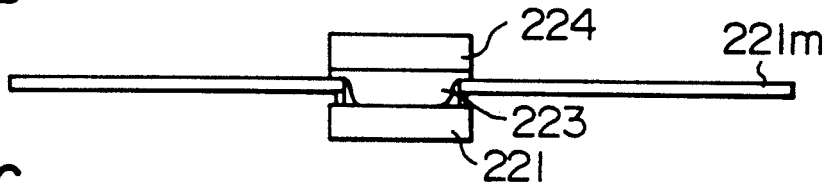

(ii) Second step (FIG. 3B)

The optical glass plate 224 is bonded to the light-receiving surface of the solid-state image pickup chip 221 by the adhesive 223 to protect the light-receiving surface.

Figure 3C:
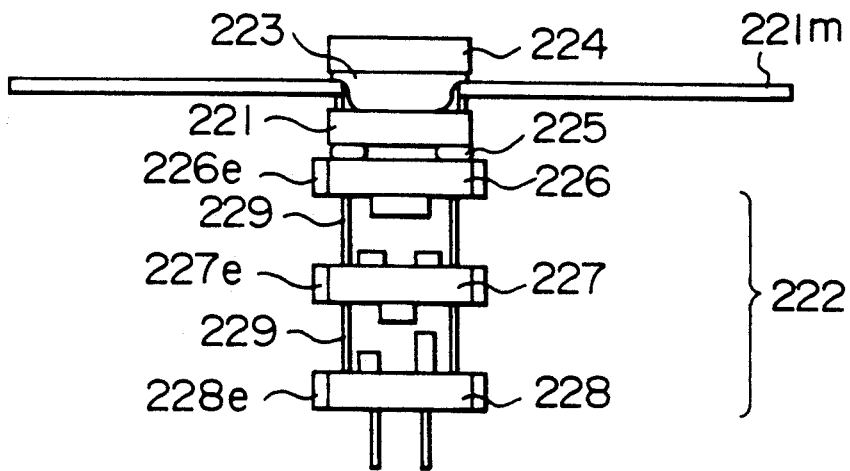

(iii) Third step (FIG. 3C)

The chip-connecting board 226, the circuit board 227 and the connector board 228 are arranged in such a manner that their side electrodes 226e, 227e and 228e are disposed in registry with one another, and these three boards are aligned with each other. They are connected together by the connection pins 229 to provide the circuit module 222. A surface of the solid-state image pickup chip 221 opposite to the light-receiving surface thereof is bonded to the chip-connecting board 226 through the adhesive 225.

Figure 3D:
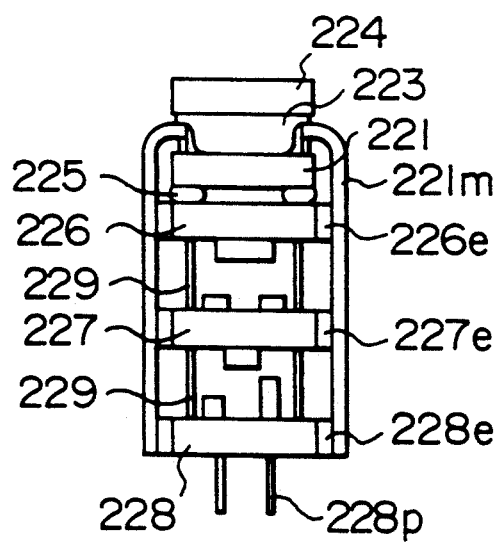

(iv) Fourth step (FIG. 3D)

Each outer-lead 221m is bent through about 90° at a point near the chip 221, and is soldered to the side electrodes 226e, 227e and 228e of the boards 226, 227 and 228 to make electrical connections among the boards, thereby constituting the image pickup unit 22.

(v) Fifth step (FIG. 2)

The image pickup unit 22 is inserted into the chassis 24, and the optical glass plate 224 is fixed at its outer periphery to the chassis 24 by an adhesive 230. Subsequently, the optical filter 21 is inserted into the chassis 24 through one open end thereof, and the adhesive 25 is filled in the gap between the optical filter 21 and the chassis 24. Further, the seal plate 23 is inserted into the other open end of the chassis 24, and the adhesive 25 is filled in the gap between the seal plate 23 and the chassis 24. With the above procedure, the assembling of the camera head is completed.

As described above, in this embodiment, the electrodes of the solid-state image pickup chip are directly connected through the outer-leads with the inner-leads to the electrodes of the chip-connecting board, the circuit board, the connector board.

Figure 4:
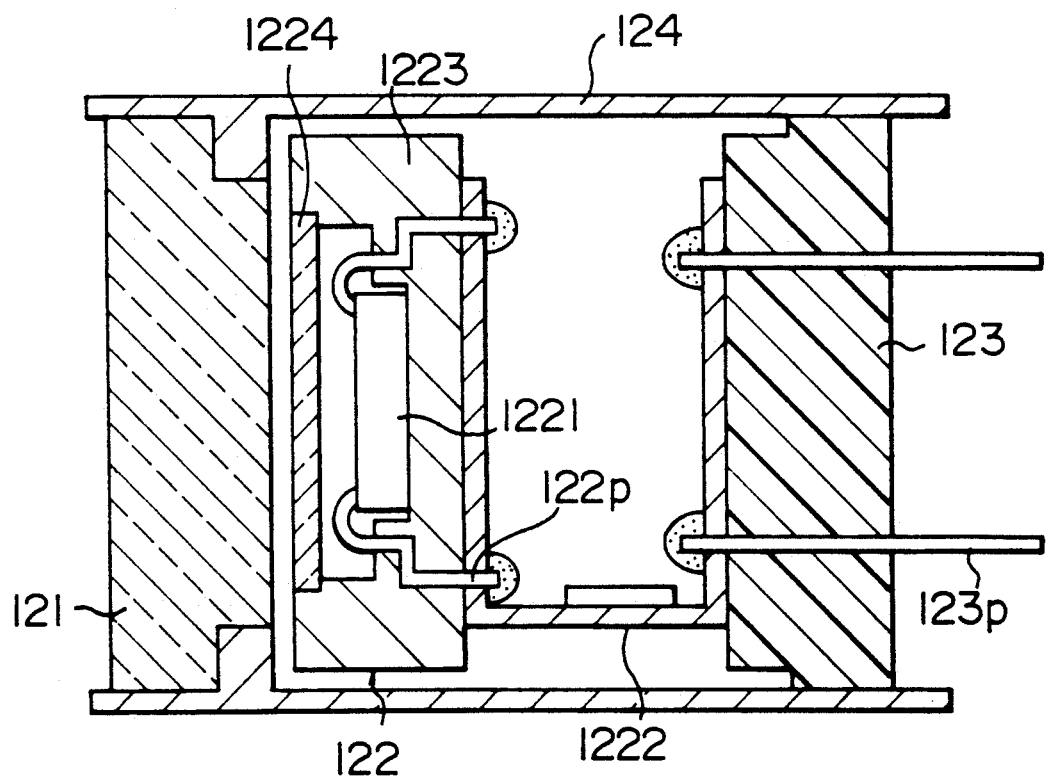
FIG. 4 is a cross-sectional view of a conventional camera head.

On the other hand, in a conventional camera head as shown in FIG. 4, a chassis 124 houses therein an optical filter 121, a solid-state image pickup element 122, a circuit board 1222 and a receptacle 123. The solid-state image pickup element 122 has a solid-state image pickup chip 1221 sealed between a ceramics package 1223 and an optical glass plate 1224. Terminal pins 122p of the solid-state image pickup element 122 are soldered to one arm of the circuit board 1222, and connection pins 123p of the receptacle 123 are soldered to the other arm of the circuit board 1222.

As apparent from this, in this embodiment of the invention, it can be possible to reduce the number of the associated parts which have heretofore been required for feeding the signals from the solid-state image pickup chip to the circuit board and the external lead pins. In addition, in this embodiment of the invention, the opposite open ends of the outer chassis are closed by the optical filter and the moisture prevention plate (seal plate), respectively, and the gap between the chassis and each of these two parts is filled with the adhesive to thereby seal the inner parts. With this arrangement, the parts (including the electric circuit board) contained in the chassis can be sealed, and therefore the stability and reliability of the circuit can be enhanced. Further, in this embodiment of the invention, in the case where the solid-state image pickup chip of ⅓ inch (8.5 mm) is used, the outer diameter of the camera head is about 10 mm, and therefore is smaller about 5 mm than that of the conventional camera head.

In the above embodiment, although the light-receiving surface of the solid-state image pickup chip is protected by the optical glass plate, an optical filter may be used instead of this optical glass plate, in which case the optical filter may be replaced by an optical glass plate.

Instead of the seal plate, an adhesive having a sealing effect may be used to seal the open end of the chassis, in which case the adhesive is applied to the entire open end of the outer chassis except for the external lead pins 228p.

In the above embodiment, although the side electrodes are provided on the chip-connecting board 226, the circuit board 227 and the connector board 228, respectively, there side electrodes may be omitted by transmitting the signal though the connection pins 229.

In each of the above modifications, similar effects as achieved in the above embodiment can be obtained.

As is clear from the above embodiment, the electrodes of the solid-state image pickup chip are connected directly to the side electrodes of the circuit board through the outer-leads with the inner-leads. Therefore a ceramics package 1223 and any component part 1222 for fixing the ceramics package are not needed. Further, the opposite open ends of the chassis are closed by the optical filter and the seal plate, respectively, and the gap between the chassis and each of these two parts is filled with the adhesive to seal the interior of the chassis. With this arrangement, not only the solid-state image pickup chip but also the boards including the electric circuits parts can be sealed, and therefore the stability and reliability of the circuit are advantageously enhanced.

Further, in the production method of the present invention, after the very weak electrodes of the solid-state image pickup chip are reinforced by the optical glass plate, the outer-leads are bent, and therefore production defects such as the separation of the electrode can advantageously be reduced. Further, the electrodes of the boards are first aligned with one another, and then in this condition, the wiring of the very thin outer-leads are carried out. Therefore, the outer-leads can advantageously be connected to the side electrodes of these boards without applying any undue force to the outer-leads.

With the above construction, there is provided an advantage that the outer diameter of the camera head can be reduced to a small size close to the diagonal length of the solid-state image pickup chip. This provides an advantage that an image of a narrow portion, such as the interior of a pipe and the interior of a precision machine, can be picked up, which has not heretofore been achieved.

What is claimed is:

1. A camera head for a solid-state image pickup device comprising:

a chassis which has opposite open ends; and an image pickup unit housed in said chassis, said image pickup unit including:

a solid state image pickup chip constituted by a solid-state image pickup semiconductor device, chip-connecting board disposed adjacent to said solid-state image pickup chip and having an electric circuit mounted thereon, a connector board having external lead pins, leads connecting electrodes provided at an outer peripheral edge of at least one of said chip-connecting board and said connector board to electrodes of said solid-state image pickup chip, said leads being integrated with said electrodes of at least one of said chip-connecting board and said connector board, and, a protective member sealing a light-receiving surface of said solid-state image pickup chip, said protective member being one of an optical glass plate and an optical filter.

2. A camera head for a solid state image pickup device comprising:

an image pickup unit including;

a solid-state image pickup chip constituted by a solid-state image pickup semiconductor device, chip-connecting board disposed adjacent to said solid-state image pickup chip and having an electric circuit mounted thereon, a connector board having external lead pins, leads connecting electrodes provided at an outer peripheral edge of at least one of said chip-connecting board and connector board to electrodes of said solid-state image pickup chip, said leads being integrated with said electrodes of at least one of said chip-connecting board and connector board, and a protective member sealing a light-receiving surface of said solid-state image pickup chip, said protective member being one of an optical glass plate and an optical filter, a chassis which has opposite open ends and houses therein said image pickup unit;

a first seal member for sealing one end of said chassis, which is one of an optical glass plate and an optical filter; and a second seal member for sealing the other end of said chassis.

3. A camera head according to claim 2, wherein said second seal member is in the form of a plate.

4. A camera head according to claim 2, wherein said second seal member is an adhesive.

5. A method of producing a camera head for a solid-state image pickup device, comprising the steps of:

connecting outer-leads respectively to electrodes of a solid-state image pickup chip via inner-leads, which chip is constituted by a solid-state image pickup semiconductor device;

bonding a protective member to a light-receiving surface of said solid-state image pickup chip, said protective member being one of an optical glass plate and an optical filter;

arranging a chip-connecting board and a connector board in an aligned manner at a side of said solid-state image pickup chip opposite to said light-receiving surface thereof, and connecting said chip-connecting board and said connector board together, said chip-connecting board having electric circuit parts mounted thereon, and said connector board having external lead pins;

bending said outer-leads to be brought into contact with electrodes provided respectively at outer peripheral edges of said chip-connecting board and said connector board, and connecting said outer-leads to said electrodes of said two boards to form an image pickup unit;

inserting said image pickup unit into a chassis having opposite open ends; and sealing one open end of said chassis adjacent to said light-receiving surface of said solid-state image pickup chip by a first seal member, said first seal member being one of an optical glass plate and an optical filter, and sealing the other open end of said chassis by a second seal member.

* * * * *